Patented June 10, 1947

2,422,050

UNITED STATES PATENT OFFICE 2,422,050

METHOD OF MAKING 2-AMINO-5-SUBSTITUTED 1,3,4-THIADIAZOLE

George W. Steahly, St. Louis, Mo., assignor to Monsanto Chemical Company, St. Louis, Mo., a corporation of Delaware No Drawing. Application July 2, 1945,
Serial No. 602,933

7 Claims. (Cl. 260—302)

This invention relates to 1,3,4-thiadiazoles and more particularly to an improved method of making 2-amino-5-substituted-1,3,4-thiadiazoles.

2-amino-5-substituted-1,3,4-thiadiazoles are generally prepared by condensing an acyl chloride with an excess of thiosemicarbazide. The yields by this process are relatively low, ranging from approximately 30% to approximately 45%. Certain 2-amino-1,3,4-thiadiazoles having a substituent in the 5-position, for example, alkyl, alkenyl, aralkyl and cycloalkyl radicals have been found useful as analgesic agents. Certain of the 2-sulfanilyl derivatives of 2-amino-5-substituted-1,3,4-thiadiazoles, for example the 5-alkyl and 5-alkenyl derivatives having from 2 to 4 carbon atoms in the alkyl and alkenyl radicals, and the 5-cycloalkyl derivatives, have been found to be strikingly active as anti-bacterial agents. The low yields obtained by the usual process of preparing the thiadiazoles renders the manufacturing cost of these compounds relatively high and it is most desirable that a method be found which will reduce the manufacturing cost by providing better yields of the desired compounds.

According to the method of the present invention, generally stated, excellent yields and in many cases substantially quantitative yields of 2-amino-5-substituted-1,3,4-thiadiazoles may be obtained by condensing one equivalent of an acyl chloride with an equivalent of thiosemicarbazide in the presence of an additional equivalent of the acyl chloride and recovering the 2-amino-5-substituted-1,3,4-thiadiazole from the reaction mixture. The reaction is, in general, exothermic. However, in some instances it is advisable to add heat during the course of the reaction and in other instances it may be desirable to apply external cooling to control the reaction within safe limits. In the commercial operation of the process, the monocarboxylic acid formed as a by-product in the reaction may be reclaimed by any desired means, depending upon the properties of the particular acid involved. In general, however, the acid may be recovered by a fractional distillation procedure.

In a special embodiment of the process of the present invention in the preparation of 2-amino-5-alkenyl-1,3,4-thiadiazoles by this process, one equivalent of a chloralkanoyl chloride is condensed with an equivalent of thiosemicarbazide in the presence of an additional equivalent of the chloralkanoyl chloride. In the operation of this embodiment of the process, the reactants are mixed and heated, for example at 75° C., until the evolution of hydrogen chloride has ceased. Following this the reaction mixture may be processed by any desirable procedure for the recovery of the 2-amino-5-alkenyl-1,3,4-thiadiazole. For example, the reaction mixture may be dissolved in water and hydrolyzed with alkali to remove hydrogen chloride from the 2-amino-5-chloroalkyl-1,3,4-thiadiazole compound and to liberate the free base compound. The free base precipitated within the solution on cooling may be filtered off, washed with water and dried.

The following examples will serve to illustrate the novel process of the present invention. These examples are to be construed merely as illustrative and not as limiting the invention except as defined in the appended claims.

EXAMPLE I

*2-amino-5-ethyl-1,3,4-thiadiazole*

A mixture of 46.3 g. (0.5 mole) of propionyl chloride and 22.8 g. (0.25 mole) of thiosemicarbazide was prepared and heated with stirring to 35° C. at which point hydrogen chloride was evolved and the reaction proceeded exothermically. The reaction temperature was maintained below 60° C. When the evolution of hydrogen chloride had ceased, the reaction mixture was cooled to room temperature and thereafter dissolved in 150 cc. of water and filtered. The filtrate was rendered alkaline by adding 50% sodium hydroxide solution to the cooled solution. The product, 2-amino-5-ethyl-1,3,4-thiadiazole, was filtered, washed with water and dried at 80° C. Melting point, 188–193° C. Yield, 30.9 g. (96%).

EXAMPLE II

*2-amino-5-vinyl-1,3,4-thiadiazole*

A mixture of 127 g. (1 mole) of beta-chloro propionyl chloride and 45.5 g. (0.5 mole) of thiosemicarbazide was prepared and heated with stirring to approximately 35° C. and thereafter maintained at a temperature below 60° C. until the evolution of hydrogen chloride had ceased. Thereafter the reaction mixture containing 2-amino-5-chloroethyl-1,3,4-thiadiazole hydrochloride was dissolved in approximately 400 cc. of warm 50% alcohol containing 50 g. of sodium hydroxide. The resulting mixture was refluxed for 3 hours, water was added, the alcohol was distilled off and the mixture was cooled. The solid product which formed in the solution was filtered off, washed and dried. This material was 2-amino-5-vinyl-1,3,4-thiadiazole. In place of beta-chloro propionyl chloride, alpha-chloro propionyl chloride may be employed.

EXAMPLE III

*2-amino-5-cyclopropyl-1,3,4-thiadiazole*

A mixture of 42 g. (0.4 mole) of cyclopropyl carbonyl chloride and 18 g. (0.2 mole) of thiosemicarbazide was prepared and heated with stirring to 50° C. and maintained at a temperature below 60° C. until the evolution of hydrogen chloride had ceased. Thereafter the reaction mixture was cooled to room temperature, dissolved in 800 cc. of water and filtered. The solution was rendered alkaline by slowly adding 50% sodium hydroxide solution to the cooled solution and the material which separated in the solution was filtered off, washed with water and dried at 80° C. Melting point 210–211° C. (corr.). The yield was substantially quantitative.

EXAMPLE IV

*2-amino-5-benzyl-1,3,4-thiadiazole*

A mixture of 0.5 mole of phenylacetyl chloride and 0.25 mole of thiosemicarbazide was prepared and heated with stirring to 50° C. and maintained thereafter below 60° C. until the evolution of hydrogen chloride had ceased. Thereafter the reaction mixture was cooled to room temperature, dissolved in 100 cc. of water and filtered. The filtrate was rendered alkaline by slowly adding 50% sodium hydroxide solution to the cooled filtrate. The solid material which precipitated was filtered off, washed with water and dried. The product was 2-amino-5-benzyl-1,3,4-thiadiazole; M. P. 200–202° C. Yield, 70%.

EXAMPLE V

*2-amino-5-propenyl-1,3,4-thiadiazole*

A mixture of 74 g. (0.7 mole) of crotonyl chloride and 32.2 g. (0.35 mole) of thiosemicarbazide was prepared and heated with stirring to 35° C. and maintained at a temperature below 60° C. until the evolution of hydrogen chloride had ceased. Thereafter the reaction mixture was cooled to room temperature, dissolved in 200 cc. of water and filtered. The filtrate was rendered alkaline with 50% sodium hydroxide solution. The solid material which separated in the solution was filtered off, washed and dried. The product was 2-amino-5-propenyl-1,3,4-thiadiazole.

In the practice of the process of the present invention in order to obtain the maximum yield of which the process of the present invention is capable, it has been found necessary to employ a ratio of two moles of acyl chloride to one mole of thiosemicarbazide. A lower ratio of acyl chloride to thiosemicarbazide can be employed; however, the yields have been found to be considerably less in that instance. A ratio of acyl chloride to thiosemicarbazide of greater than 2 to 1 may be employed in the process; however, it has been found that no further beneficial result is obtained by increasing this ratio, except in those instances in which additional amounts of acyl chloride may be employed to compensate for losses due to side-reactions. The term "acyl chloride" in the appended claims is defined as a compound composed of a radical selected from the group consisting of alkyl, alkenyl, aralkyl and cycloalkyl radicals linked by a carbon atom to the carbonyl chloride radical.

While the process of the present invention has been described and illustrated in the foregoing specification and examples, it is to be observed that the present invention is not to be construed as being limited in respect to any particular substances, proportions, conditions or combinations except as defined in the claims.

I claim:

1. An improved method of making 2-amino-5-substituted 1,3,4-thiadiazoles in which the 5-position substituent is a radical selected from the group consisting of alkyl, alkenyl, aralkyl and cycloakyl radicals comprising condensing one equivalent of an acyl chloride with one equivalent of thiosemicarbazide in the presence of at least one additional equivalent of said acyl chloride, rendering the mixture alkaline, and recovering the 2-amino-5-substituted-1,3,4-thiadiazole from the reaction mixture.

2. An improved method of making 2-amino-5-alkenyl-1,3,4-thiadiazoles comprising condensing one equivalent of a chloralkanoyl chloride with one equivalent of thiosemicarbazide in the presence of an additional equivalent of said chloride, reacting the resulting 2-amino-5-chloralkyl-1,3,4-thiadiazole hydrochloride with an alkaline hydrolyzing agent until hydrogen chloride has been removed from the compound and the free base has been liberated, and subsequently recovering the 2-amino-5-alkenyl-1,3,4-thiadiazole from the reaction mixture.

3. An improved method of making 2-amino-5-ethyl-1,3,4-thiadiazole comprising condensing one equivalent of propionyl chloride with one equivalent of thiosemicarbazide in the presence of an additional equivalent of said chloride, rendering the mixture alkaline, and subsequently recovering the 2-amino-5-ethyl-1,3,4-thiadiazole from the reaction mixture.

4. An improved method of making 2-amino-5-cyclopropyl-1,3,4-thiadiazole comprising condensing one equivalent of cyclopropyl carbonyl chloride with one equivalent of thiosemicarbazide in the presence of an additional equivalent of said chloride, rendering the mixture alkaline, and subsequently recovering the 2-amino-5-cyclopropyl-1,3,4-thiadiazole from the reaction mixture.

5. An improved method of making 2-amino-5-vinyl-1,3,4-thiadiazole comprising condensing one equivalent of beta-chloro propionyl chloride with one equivalent of thiosemicarbazide in the presence of an additional equivalent of said chloride, reacting the resulting 2-amino-5-chloroethyl-1,3,4-thiadiazole hydrochloride with an alkaline hydrolyzing agent until hydrogen chloride has been removed from the compound and the free base has been liberated, and subsequently recovering 2-amino-5-vinyl-1,3,4-thiadiazole from the reaction mixture.

6. In the process of preparing 2-amino-5-substituted-1,3,4-thiadiazoles in which the 5-position substituent is a radical selected from the group consisting of alkyl, alkenyl, aralkyl and cycloalkyl radicals, the step comprising condensing one equivalent of an acyl chloride with one equivalent of thiosemicarbazide in the presence of an additional equivalent of said chloride.

7. An improved method of making 2-amino-5-substituted-1,3,4-thiadiazoles in which the 5-position substituent is a radical selected from the group consisting of alkyl, alkenyl, aralkyl and cycloalkyl radicals comprising condensing one equivalent of an acyl chloride with one equivalent of thiosemicarbazide in the presence of an additional equivalent of said chloride, thereafter dissolving the reaction mixture in water, alkalinizing the resulting solution and subsequently recovering the 2-amino-5-substituted-1,3,4-thiadiazole from the reaction mixture.

GEORGE W. STEAHLY.

REFERENCES CITED

The following references are of record in the file of this patent:

Berichte 29 (1896), pp. 2511–17.
Chemical Abstract, vol 36, p. 70094 (1942).